United States Patent [19]

Miller et al.

[11] 3,862,127

[45] Jan. 21, 1975

[54] PROCESS

[75] Inventors: Roger L. Miller, Rochester; James H. Sharp, Webster, both of N.Y.; Marcel A. Lardon, Trubbach, Switzerland

[73] Assignee: Xerox Corporation, Stamford, Conn.

[22] Filed: July 14, 1972

[21] Appl. No.: 271,868

Related U.S. Application Data

[63] Continuation-in-part of Ser. No. 756,362, Aug. 30, 1968, abandoned, and a continuation-in-part of Ser. No. 847,381, Aug. 4, 1969, abandoned.

[52] U.S. Cl. ............................................. 260/314.5
[51] Int. Cl............................................ C09b 47/04
[58] Field of Search ................................ 260/314.5

[56] References Cited
OTHER PUBLICATIONS

Robertson, J. Chem. Soc., 1935, p. 615–21 and plate.
Terenim et al., Spectrochim, Acta Suppl., p. 573–578, (1957), QC451153.
Fiat Report 1313, p. 347, (Feb. 1948).

*Primary Examiner*—Harry I. Moatz
*Attorney, Agent, or Firm*—James J. Ralabate; James P. O'Sullivan; John H. Faro

[57] ABSTRACT

A method for the preparation of X-form metal-free phthalocyanine which comprises rapidly sublimating any metal-free phthalocyanine polymorph under a pressure of about 1 to about 90 Torr is disclosed.

4 Claims, No Drawings

PROCESS

BACKGROUND OF THE INVENTION

This invention relates to phthalocyanine photoconductive materials, and, more particularly, to a novel process for the preparation of X-form metal-free phthalocyanine. This application is a continuation-in-part of Ser. No. 756,362, filed in the U.S. Pat. Office on Aug. 30, 1968, now abandoned and a continuation-in-part of copending application Ser. No. 847,381 filed in the U.S. Patent Office on Aug. 4, 1969, now abandoned.

It is known that images may be formed and developed on the surface of certain photoconductive materials by electrostatic means. The basic xerographic process, as taught by Carlson in U.S. Pat. No. 2,297,691, involved uniformly charging a photoconductive insulating layer and then exposing the layer to a light-and-shadow image which dissipates charge on the portions of the layer which are exposed to light. The electrostatic image formed on the layer corresponds to the configuration of the light-and-shadow image. This image is rendered visible by depositing on the imaged layer a finely divided developing material comprising a colorant called a toner and a toner carrier. The powder developing carrier will normally be attracted to those portions of the layer which retain a charge, thereby forming a powder image corresponding to the latent electrostatic image. This powder image may then be transferred to paper and other receiving surface. The paper then will bear the powder image which may subsequently be made permanent by heating or other suitable fixing means. The above general process is also described in U.S. Pat. Nos. 2,357,809; 2,891,011; and 3,079,342.

It has recently been found that an especially sensitive electrophotographic plate may be prepared by mixing metal-free phthalocyanine in a binder, coating the mixture onto a conductive substrate and hardening the binder. Electrophotographic plates comprising phthalocyanines in a binder are described in detail in copending application Ser. No. 518,450, filed Jan. 3, 1966. It was found that an especially sensitive form of metal-free phthalocyanine could be prepared by extended dry milling or grinding of alpha or beta form metal-free phthalocyanine. This highly sensitive material was found to be a new polymorphic form of phthalocyanine. This new polymorph, now referred to as "X-form" phthalocyanine is described in detail and claimed in U.S. Pat. No. 3,357,989 and copending reissue application Ser. No. 741,815 now U.S. Pat. No. Re. 27,117. While the X-form phthalocyanine produced by grinding or milling has excellent physical properties, this method of preparation has several disadvantages. In order to arrive at a complete conversion of alpha or beta metal-free phthalocyanine to the corresponding X-form phthalocyanine often requires very extended periods of milling, often over 100 hours. Besides being time consuming, this process consumes a large amount of power and requires large and sometimes complex milling equipment. Moreover, impurities may be introduced into the phthalocyanine dispersion from the metallic or ceramic milling equipment. It is very difficult to predict the milling time or total work required in a particular milling machine to insure complete conversion to X-form phthalocyanine. When changes are made in milling equipment or techniques, test runs must be made with frequent sampling and X-ray or infrared examination to detect when complete conversion has been attained.

In copending application Ser. No. 566,839, a method for the preparation of X-form phthalocyanine is disclosed and claimed. This method comprises mixing the alpha crystalline form of metal-free phthalocyanine with a portion of the X-form and an aliphatic organic solvent, and maintaining the mixture until the alpha form is converted to the X-form. While the X-form phthalocyanine produced by this method, like the X-form material produced by grinding or milling has excellent physical properties, there are also several disadvantages associated with said method. For example, in order to obtain complete conversion of alpha to X-form, a time period of at least 16 hours is required. Aside from being very time consuming, this process proves expensive on a large scale production of X-form phthalocyanine, wherein great amounts of aliphatic organic solvents are consumed. Further, one must employ alpha metal-free phthalocyanine, rather than the corresponding beta form, as a starting component, in order to arrive at the resulting X-form. While it is true that beta metal-free phthalocyanine may be converted to alpha metal-free polymorph by dissolving it in 98% sulfuric acid solution and precipitating the solution in ice water, this conversion technique proves both difficult and expensive. Sulfuric acid tends to degrade phthalocyanine resulting in the formation of phthalimide, phthalic acid, and various nitrogen containing compounds which are intolerable in an electrophotographic system. Moreover, since it is difficult to extract sulfuric acid from the reprecipitated phthalocyanine, it is probable that there is a continuous degradation of the phthalocyanine due to residual acid.

Since large quantities of X-form phthalocyanine may be needed for electrophotographic or other uses, there is a continuing need for a simpler, cheaper, less time consuming, and more reproducible method of producing same.

It is, therefore, an object of this invention to provide a method of preparing X-form metal-free phthalocyanine devoid of the above-noted disadvantages.

Another object of this invention is to provide a one-step direct method for the preparation of X-form metal-free phthalocyanine.

Still another object of this invention is to provide a much more rapid method of preparing X-form metal-free phthalocyanine than previously known methods.

A further object of this invention is to provide a more reliable and dependable method of preparing X-form metal-free phthalocyanine than previously known methods.

It is yet another object of this invention to provide a direct method for the preparation of X-form metal-free phthalocyanine which does not require great amounts of work in energy.

Another further object of this invention is to provide a more economical method of preparing X-form phthalocyanine than previously known methods.

SUMMARY OF THE INVENTION

The foregoing objects and others are accomplished in accordance with this invention, generally speaking, by providing a novel system for the preparation of X-form metal-free phthalocyanine which comprises rapidly vacuum evaporating any of the known metal-free phthalocyanine polymorphs under a suitable pressure.

Most stable solids when heated in an open vessel melt equilibrium-wise at a definite temperature to form a liquid. At some higher definite temperature the liquid boils, equilibrium-wise, to yield a vapor. Some solids, however, change directly to a vapor without first melting, and the resulting vapor in turn changes back to a solid without first condensing to a liquid. Further, the solid to vapor transformation is an equilibrium process and, at a definite pressure, takes place at a definite constant temperature. This equilibrium-wise transformation of a solid to a vapor is known as sublimation and the amount of heat required to accomplish this change is called "heat of sublimation."

Just as molecules of all liquids tend to evaporate into the open air form the surface of said liquids, so molecules of all solids tend to escape directly into the atmosphere from the surface of the solid. Just as the vapor pressure, that is, the tendency of liquid molecules to escape, increases with increase in temperature, so does the vapor pressure of a solid increase with increase in temperature. Just as a liquid will boil when its vapor pressure equals the pressure of the atmosphere, so a solid will sublime when its vapor pressure equals the pressure of the atmosphere. Most solids have such low vapor pressures that they will melt before the temperatures at which their vapor pressure equals the atmospheric pressure is reached: as a result they do not have a chance to sublime.

Since a solid will sublime when its vapor pressure equals the outside pressure, it follows that if the outside pressure is increased, the sublimation temperature will be increased. If the outside pressure is high enough, the solid will melt before its vapor pressure gets high enough to cause it to sublime. Conversely, a solid which normally melts can be made to sublime by heating it under reduced pressure.

The phthalocyanine molecule itself is:

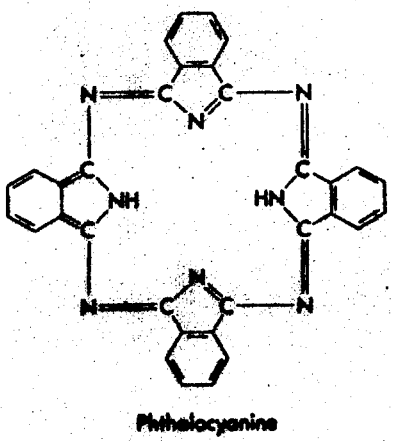

Phthalocyanine

The phthalocyanine class of compounds includes metal derivatives of phthalocyanine. The two hydrogen atoms in the center of the molecule have been replaced by metals from every group of the Periodic Table to form the group of compounds known as the metal phthalocyanines. Also, from 1 to 16 of the peripheral hydrogen atoms in the 4 benzene rings in the phthalocyanine molecule have been replaced by halogen atoms and by numerous organic and inorganic groups.

According to Moser and Thomas, more than 40 metal phthalocyanines have been prepared and several thousand different phthalocyanine compounds have been synthesized.

Thus as seen above, the phthalocyanine molecule may be metal substituted centrally and/or peripherally substituted by numerous organic and inorganic groups. Thus the terminology "a metal-free phthalocyanine" defines precisely either the phthalocyanine molecule itself or peripherally substituted phthalocyanine. Any suitable substituted or unsubstituted metal-free phthalocyanine may be used as the starting material of this invention. Metal-free phthalocyanine is known to exist in several different polymorphic forms which may be easily distinguished by comparison of their X-ray diffraction patterns and/or infrared spectra. Further, the color of the pigment varies according to the polymorphic form, the beta form being, in general, greener than the alpha or gamma forms. The alpha, beta and gamma forms of metal-free phthalocyanine are described by C. Hammon and M. Starke in "Investigation of the Electrical and Thermal-Electric Properties of the Modification of Metal-Free Phthalocyanine," Phys. Stat. Vol. 4,509 (1964). Several different forms of phthalocyanine polymers are known. Many of these phthalocyanine-containing polymers are described in "Phthalocyanine Compounds" by F. H. Moser and A. L. Thomas, Rheinhold Publishing Corporation, New York, (1963). While any suitable substituted or unsubstituted metal-free phthalocyanine may be used as the starting material of the present invention, it is highly preferable to employ the alpha or beta form in order to obtain a high yield of extremely pure X-form metal-free phthalocyanine in a minimum amount of time.

The sublimation process of the present invention should be carried out at a pressure within the range of about 1 to about 90 Torr. When a pressure of less than 1 Torr is employed, the resulting sublimation product is the alpha polymorph. When a pressure of greater than about 90 Torr is employed, the resulting sublimation product is beta phthalocyanine. While any suitable pressure within the range stated above may be used in this invention, it is highly preferable to use a pressure ranging from about 5 Torr to about 35 Torr in order to obtain the highly pure X-form metal-free polymorph. Optimum results are obtained when a pressure of about 30 Torr is employed.

Any suitable substrate material may be employed to receive the resulting sublimate material. Typical substrate materials include metals such as brass, nickel, aluminum, etc., glass, quartz, cellophane, plastics such as Mylar (polyethylene terephthalate, available from E.I. duPont deNemours and Co.), among many others.

Prior to the sublimation process, it is advisable to thoroughly cleanse the receiving substrate material. Typical cleansing agents include water, methanol, ethanol, acetone, acids, alkaline cleaners, etc.

It has been found in the laboratory that when evaporating the starting material in a bell jar, it is preferred that said starting material be kept at a distance of approximately 14 inches to approximately 18 inches from the receiving substrate material in order to avoid burning, melting or otherwise injuring said substrate material.

Although the sublimation process may be performed for any suitable time, it is preferable in order to obtain higher yield to sublime for about ½ to about 3 minutes under the enumerated conditions. Heating for more than about 3 minutes may result in the production of the beta polymorphic form, especially if pressures greater than 90 Torr are employed.

DESCRIPTION OF THE PREFERRED EMBODIMENTS

The following examples will further define various preferred embodiments of the present invention. Parts and percentages are by weight unless otherwise specified.

The crystal forms of phthalocyanine produced in each of the following examples is analyzed by conventional X-ray and infrared analysis methods. The X-ray and infrared curves produced by the materials prepared in each of the following examples is compared to curves for known alpha, beta and X-form phthalocyanine as described in detail in the above mentioned U.S. Pat. No. 3,357,989, and Reissue No. 27,117.

EXAMPLE I

A 4 inch × 4 inch × 0.005 inch sheet of optical grade Type D Mylar (a polyester) film (manufactured by E.I. duPont deNemours and Co.) is washed thoroughly, first with water and then with a solution of trisodium-phosphate in water. This is followed by rinsing said film several times with deionized water and air-drying.

After the Mylar film is dry, it is placed on the lower surface of an aluminum backing plate, said plate being positioned on a platform supported by legs and lodged in a standard bell jar type of apparatus (manufactured by Consolidated Vacuum Corporation). This apparatus comprises a metal base plate which supports the bell jar, which in turn has a vacuum tight gasket around its open edge and a standard vacuum pumping system attached to a conduit for exhausting air from said bell jar. Supported within the bell jar, and positioned approximately 16 inches below said aluminum backing plate, is a molybdenum boat.

Once the Mylar film is placed on the backing plate, about 0.5 grams of pure alpha metal-free phthalocyanine are placed in the molybdenum boat. The bell jar is placed in a position on the base plate so that the seal is effective, and the pumping system is then operated until a pressure of about 1 Torr is obtained. Electric power in the order of about 2 amps is applied to heat the boat. Heating is maintained for about 2 minutes. This causes the alpha polymorph to sublime and form a uniformly thin layer of material on the exposed surface of the Mylar film. This material is subjected to conventional X-ray and infrared analysis. Analysis shows complete conversion to X-form metal-free phthalocyanine.

EXAMPLE II

As a control for the conversion process of Example I, the experiment is repeated employing a pressure somewhat greater than about 90 Torr and heating the boat for approximately 6 minutes. Analysis shows a conversion to beta metal-free phthalocyanine.

EXAMPLE III

As a further control of the conversion process of Example I, the experiment is repeated employing a pressure of about $10^{-2}$ Torr. Analysis shows that the starting material does not undergo conversion, i.e., the resulting product is alpha metal-free phthalocyanine.

EXAMPLE IV

Example I is repeated using beta metal-free phthalocyanine as a starting material. A pressure of about 10 Torr is employed. The starting material is heated for about 30 seconds. Analysis indicates a complete conversion to X-form metal-free phthalocyanine.

EXAMPLE V

As a control for the conversion process of Example IV, the experiment is repeated employing a pressure of about 100 Torr and heating the boat for about 6 minutes. Analysis shows that the starting material does not undergo conversion, i.e., the resulting product is beta metal-free phthalocyanine.

EXAMPLE VI

As a further control for the conversion process of Example IV, the experiment is repeated employing a pressure of about $10^{-2}$ Torr. Analysis shows a conversion to alpha metal-free phthalocyanine.

EXAMPLE VII

Example 1 is repeated except that a pressure of about 30 Torr is employed and the starting material is heated for about 1 minute. Analysis indicates conversion to X-form metal-free phthalocyanine.

While specific components of the present system are defined in the working examples above, any of the other typical materials indicated above may be substituted in said working examples if appropriate. In addition, many other variables may be introduced in the present process, such as further purification steps or other reaction components which may in any way effect, enhance, or otherwise improve the present process.

While various specifics are cited in the present application, many modifications and ramifications will occur to those skilled in the art upon a reading of the present disclosure. These are intended to be encompassed within the scope of this invention.

What is claimed is:

1. A method for preparing the X-form of metal-free phthalocyanine which comprises rapidly sublimating an unsubstituted alpha or beta polymorph of metal-free phthalocyanine at a pressure of about 1 to about 90 Torr.

2. The method of claim 1, wherein said pressure is about 5 to about 25 Torr.

3. The method of claim 1, wherein said sublimating is carried out for about ½ to about 3 minutes.

4. The method of claim 1 wherein said pressure is about 30 Torr.

* * * * *